Patented Sept. 26, 1922.

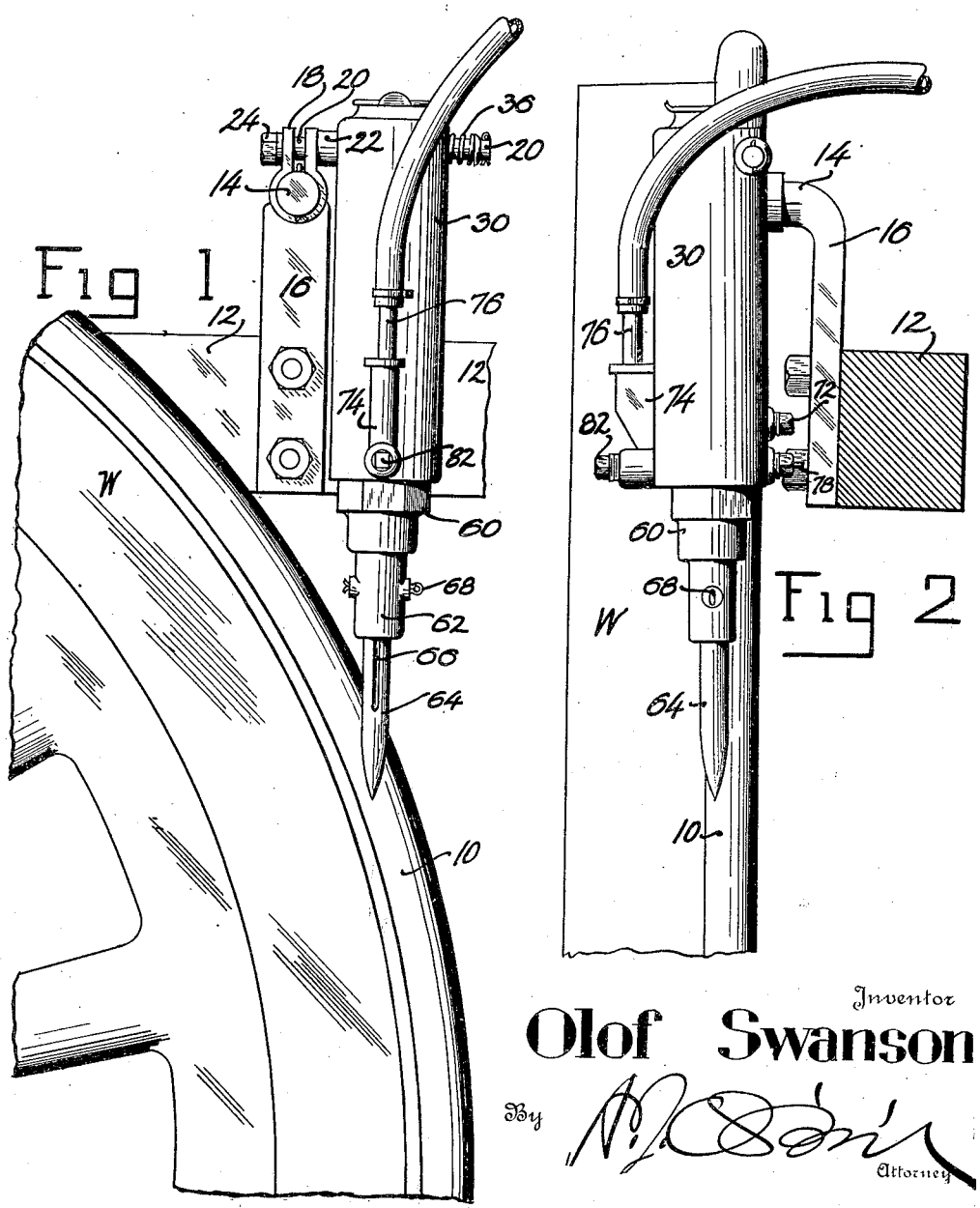

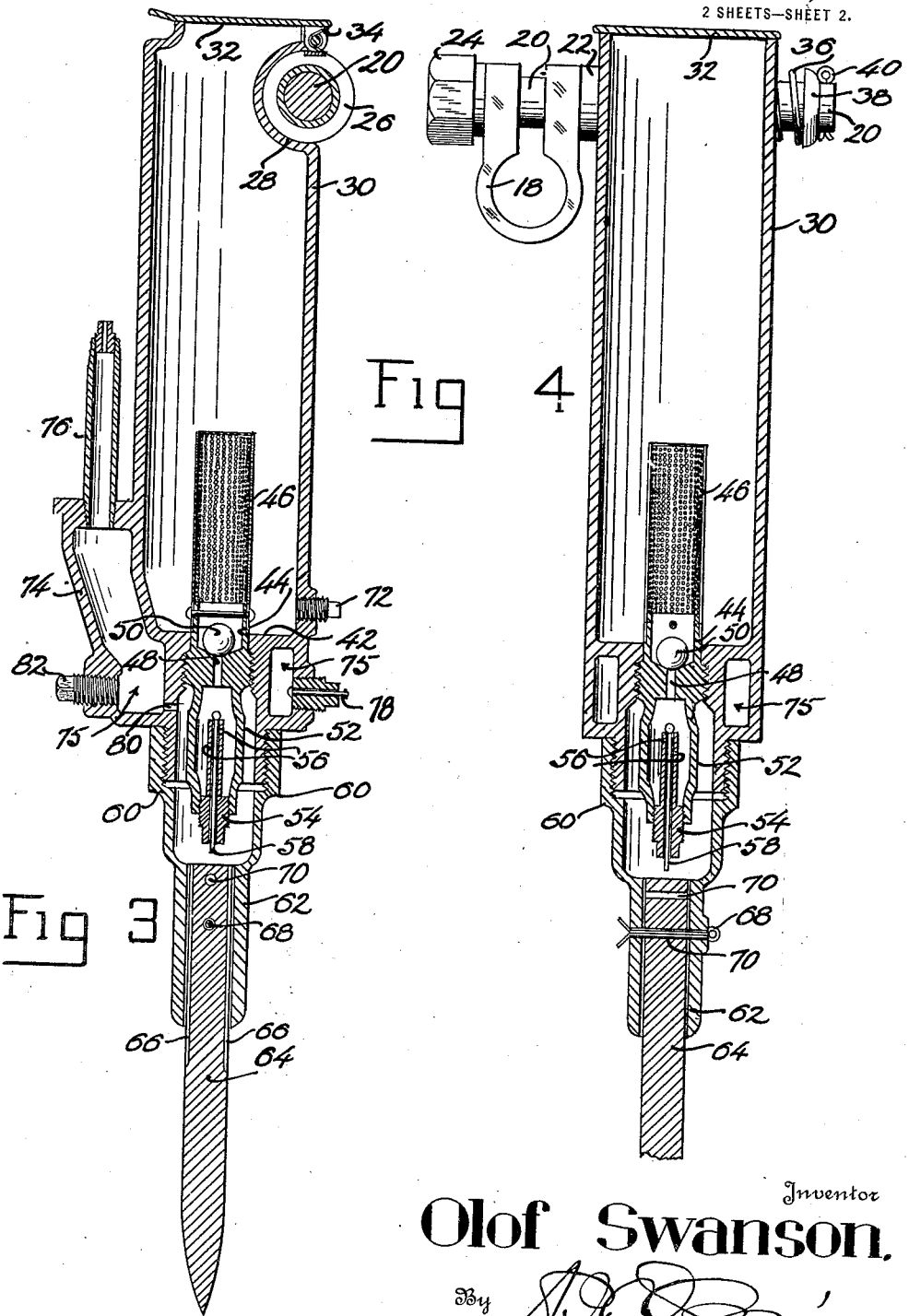

1,430,199

UNITED STATES PATENT OFFICE.

OLOF SWANSON, OF DENVER, COLORADO.

LUBRICATOR.

Application filed March 27, 1920, Serial No. 369,231. Renewed February 24, 1922. Serial No. 539,035.

*To all whom it may concern:*

Be it known that I, OLOF SWANSON, a citizen of the United States, residing in the city and county of Denver and State of Colorado, have invented certain new and useful Improvements in Lubricators; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a comparatively simple and efficient structure for directly applying oil to the flanges of wheels on railway rolling stock. The invention is an improvement over the structure described and claimed in my earlier Patent, No. 1,279,173, granted September 17th, 1918.

Briefly, the invention comprises a lubricant-carrying casing, swingingly mounted to lie in line with a wheel and directly over the flange at one side of the wheel. The casing is so mounted that the tendency is for a depending pin which carries down the lubricant to engage against the inner side of the flange. The pin is loosely mounted in the casing so that vibration causes the oil to be fed down the pin to the wheel flange.

A pair of valves are provided for feeding lubricant from the casing to said pin, said valves being operated by vibration imparted through the car, on which the device is mounted, and also by engagement of said pin with said flange. A steam chamber is provided at the base of the casing, into which steam is passed for warming the lower end of the casing and the lubricant therein. A port is provided for the escape of surplus steam and water of condensation. There is also a passage from the steam chamber into the space directly above said pin, by means of which steam may be fed out with the oil flowing down the pin in order to keep the passages thereabout open.

In the drawings:

Fig. 1 is a side elevation showing the device in use.

Fig. 2 is an edge elevation.

Fig. 3 is a vertical section looking in the direction of Fig. 2; and

Fig. 4 is a vertical section looking in the direction of Fig. 1.

A carwheel W is shown, said wheel having the usual flange 10, to which lubricant is to be applied. A portion of the frame of a car is shown at 12, and the lubricator is mounted upon an offset portion 14 of an arm 16, secured to said frame 12, by means of a clamp band 18, mounted upon a rod 20 and retained thereon by means of a boss 22, fixedly secured on said rod 20, and a tightening nut 24. The rod 20 passes through bearing 26, fixed in a curved seat or recess 28 in the lubricant casing 30, which casing has a cover 32. The end of the pin 20 opposite the nut 24 is provided with a spring 36, which bears at one end against the bearing 26 and at the other end against a collar 38, held on said rod 20 by means of a cotter key 40. The lower wall 42 of the casing 30 has threaded thereinto a valve seat 44, which carries a screen 46 and has in its bottom a vertically disposed passage 48, adapted to be closed by a ball valve 50. Said valve seat 44 is provided with a depending housing 52, providing an auxiliary lubricant chamber, into whose lower end there is threaded a second valve seat 54, which has an upstanding portion provided with a pair of staggered apertures 56. A regulator pin 58 is carried loosely in the vertically disposed passage of said valve seat 54. The lowermost portion of the casing 30 has threaded thereon a nipple 60, whose lower end is reduced as shown at 62, and carries a loosely mounted flange-engaging pin 64, provided on its sides at its upper portion with vertically disposed grooves 66 for conducting lubricant. A cotter key 68 passes loosely through said reduced portion 62 and through one of a plurality of passages 70 in said pin 64.

An extension of the casing 30 is provided as indicated at 74, to furnish a steam chamber 75 around the lower portion of the casing adjacent the valve seat 44. A connection 76 for attaching the steam hose is provided in the upper part of said extension, and a loosely-arranged valve pin 78 is provided on the opposite side for the escape of steam and water condensation.

A steam duct 80 provides communication between said steam chamber 75 and the space around said lubricant housing 52. The area of the duct 80 is less than the area of the lubricant passage around said flange-engaging pin 64, including said grooves 66. For the purpose of draining the main chamber in the casing 30, a plug 72 is provided, and for like purposes a plug 82 is provided for the steam chamber 75.

In the operation of the device, the casing 30 carries a store of lubricant. The tendency of the device is to swing in a vertical plane about the bolt 20, whereby the end of the pin 64 is always retained against the inner face of the flange 10 because of the tendency of the center of gravity of the entire device to find a position directly below the pole 20. Vibration imparted to the device from the car frame 12 and also from engagement of the pin 64 with the flange 10, causes the ball valve 50 to be moved from its seat sufficiently to allow a quantity of lubricant to pass through the passage 48 into the space within the housing 52. According to the level of the lubricant in the housing 52, it may leave through either the lower or the upper one of the ports 56, and the vibration of the pin 58 induces a feeding of the lubricant so that it will run down and be caused to drop onto the top of the flange-engaging pin 64.

The steam in the chamber 75 keeps these parts sufficiently warm to maintain the lubricant at proper consistency. The small amount of steam which escapes through duct 80 and passes down alongside the flange-engaging pin 64, keeps the passages adjacent the groove 66 clear, and due to the fact that the duct 80 is relatively small, no pressure will be formed in the cavity directly above the pin 64 to interfere with the movement of lubricant down said regulator pin 58.

From the foregoing, it will be seen that in this manner vibration causes the lubricant to be fed efficiently to the flange of the carwheel, and the steam keeps it in proper condition for such feeding. Vibration also causes the pin 78 to permit escape of steam and water of condensation in an efficient manner.

It will also be noted that the upstanding portion of the valve seat 54, which lies below the apertures 56, provides a cavity for the deposit of any sediment which might be fed through the passage 48. Until the sediment level reaches the lower aperture 56, the oil will be fed through both of said apertures 56 and around the top of said upstanding portion. Even when the sediment level rises above the lower aperture, or even above the upper aperture, the oil would still be fed when said regulator pin 58 is vibrated.

The loose mounting of pin 64 on cotter key 68 permits said pin 64 to move in its mounting and induce a flow of lubricant down its sides.

I claim:

1. A lubricator comprising a casing having a pivot pin mounted at one side of the center of gravity of the device, and a lubricant-feeding pin depending from the lower end thereof and adapted to engage one side of a wheel-flange, whereby said pin will be held in engagement with the flange by gravity.

2. A lubricator comprising a casing adapted to contain lubricant, a loose valve operable by vibration to control the escape of lubricant therefrom, an auxiliary chamber into which lubricant is fed through said valve, a regulator pin to control the feed of lubricant from said chamber, and a device for feeding lubricant therefrom to wheel-flange.

3. A lubricator comprising a casing adapted to contain lubricant, a valve to control the escape of lubricant therefrom, an auxiliary chamber into which lubricant is fed through said valve, a regulator pin to control the feed of lubricant from said chamber, and a feeding pin for feeding lubricant therefrom to wheel-flange, said regulator pin being adapted to induce feed of lubricant when vibrated, said feeding pin having a groove extending longitudinally along one portion of its surface to induce feed of lubricant.

4. A lubricator comprising a casing adapted to contain lubricant, a valve to control the escape of lubricant therefrom, an auxiliary chamber into which lubricant is fed through said valve, a regulator pin to control the feed of lubricant from said chamber, and a device for feeding lubricant therefrom to wheel-flange, the bottom of said chamber having a hollow member upstanding therein in which said regulator pin is positioned, said hollow member having spaced discharge apertures therein adjacent its upper end whereby a sediment space is formed at the base thereof.

5. A lubricator comprising a casing adapted to contain lubricant, means to control the escape of lubricant therefrom, a chamber therebeneath into which said lubricant escapes, means in the bottom of said chamber for feeding said escaped lubricant to a wheel-flange, and means for feeding a small amount of steam into said chamber.

6. A lubricator comprising a casing adapted to contain lubricant, means to control the escape of lubricant therefrom, a chamber therebeneath into which said lubricant escapes, means in the bottom of said chamber for feeding said escaped lubricant to a wheel-flange, and a steam chamber disposed adjacent said lubricant chamber, there being a port between said steam chamber and said lubricant chamber for supplying a small amount of steam to the latter.

7. A lubricator comprising a casing adapted to contain lubricant, means to control the escape of lubricant therefrom, a chamber therebeneath into which said lubricant escapes, means in the bottom of said chamber for feeding said escaped lubricant to a wheel-flange, and a steam chamber disposed adjacent said lubricant chamber, there being a port between said steam chamber and said lubricant chamber for supplying a small amount of steam to the latter, said lubricant-feeding means comprising a pin loosely mounted in the lower end of the lubricant chamber, and along the sides of which the lubricant is adapted to flow.

8. A lubricator comprising a casing having a pivot pin mounted at one side of the center of gravity of the device, and a lubricant-feeding pin depending from the lower end thereof and adapted to engage one side of a wheel-flange, whereby said pin will be held in engagement with the flange by gravity, said pivot pin being received in a cavity in one side of the casing.

9. A lubricator, comprising a lubricant container and a feeding pin projecting into said container, said pin having a groove therein extending along one side thereof and longitudinally thereof from within the container, to assist feeding of lubricant.

10. A lubricator comprising a casing adapted to contain lubricant, a chamber therein, a second chamber of smaller capacity, a passageway connecting said chambers, a ball valve between said chambers, said valve permitting oil to flow from the first named chamber to the second chamber when the casing vibrates sufficiently to move the ball from its seat, a third chamber connected to said second named chamber by a passage, means in said last named passage for restricting the flow of lubricant therethrough, means for admitting steam into said last named chamber, and means for conducting said lubricant to a wheel flange of a locomotive.

In testimony whereof I affix my signature.

OLOF SWANSON.